(12) United States Patent
Phillips

(10) Patent No.: US 7,034,256 B1
(45) Date of Patent: Apr. 25, 2006

(54) POPCORN HEATING DEVICE

(76) Inventor: Richard D. Phillips, 5313 Arbor Vitae #8, Westchester, CA (US) 90045

( * ) Notice: Subject to any disclaimer, the term of this patent is extended or adjusted under 35 U.S.C. 154(b) by 0 days.

(21) Appl. No.: 10/941,959

(22) Filed: Sep. 16, 2004

(51) Int. Cl.
*F27D 11/00* (2006.01)

(52) U.S. Cl. ............ 219/432; 219/385; 219/387; 219/528; 219/529; 219/548; 126/261; 126/266; 383/14; 383/97; 383/101

(58) Field of Classification Search ........ 219/385–387, 219/432, 528–529, 548; 126/261, 266; 383/14, 383/97, 101, 110
See application file for complete search history.

(56) References Cited

U.S. PATENT DOCUMENTS

| | | | |
|---|---|---|---|
| 2,609,479 A | | 9/1952 | Loewe |
| 4,827,107 A | * | 5/1989 | Peery ................ 219/521 |
| 5,569,401 A | * | 10/1996 | Gilliland et al. ........ 219/386 |
| 5,932,129 A | | 8/1999 | Hyatt |
| 6,018,143 A | * | 1/2000 | Check ................ 219/387 |
| D426,049 S | | 6/2000 | Biskner et al. |
| 6,108,489 A | | 8/2000 | Frohlich et al. |
| 6,329,644 B1 | | 12/2001 | Hyatt |
| 6,570,133 B1 | | 5/2003 | Grosso, Sr. |

* cited by examiner

*Primary Examiner*—Shawntina Fuqua

(57) ABSTRACT

A popcorn heating device includes a bag member, a receptacle removably connectable therewith and having a top portion including inner and outer layers and a medially disposed heat-retaining layer. The device further includes a mechanism for electrically heating the receptacle and the bag member. The heating mechanism includes a base member having at least one electrical conductor including a plurality of conducting posts. The base member further includes a first switch for toggling at least one electrical conductor between on and off positions and a second switch for controlling the temperature of at least one electrical conductor. A plurality of heating elements are electrically coupled to the plurality of conducting posts and a plug provided for electrically coupling the base member to a power source.

20 Claims, 4 Drawing Sheets

POPCORN HEATING DEVICE

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to food heating devices and, more particularly, to a popcorn heating device for keeping popcorn warm after popping.

2. Prior Art

Modern day devices for heating foods and the like often include a rechargeable phase change material. Once charged with heat energy, the phase change material radiates heat energy to keep foods and other objects warm.

For delivery of food and other products, insulated boxes and thermal bags are currently used to keep the food warm while it is transported from one place to another. Typically, these bags and boxes also include a heat reflective material on their inner surfaces. Even though the food is stored in an insulated box or bag, the temperature of the food begins declining once the food is removed from the cooking device. Thermal bags and boxes only serve to reduce the rate at which the food loses heat and do not maintain the temperature of the food.

Phase change materials have been found to be particularly useful for food warming because they utilize their latent heats of fusion for thermal storage. The latent heat of fusion of a phase change material is substantially greater than the sensible heat capacity of the material. Upon melting and freezing, per weight, a phase change material absorbs and releases substantially more energy than a sensible heat storage material which is heated and cooled in the same temperature range.

In contrast to a sensible heat storage material which absorbs and releases heat energy essentially uniformly over a broad range of temperature, a phase change material absorbs and releases a large quantity of energy in the vicinity of its melting/freezing point in a controlled manner. In addition to its latent heat storage capacity, a phase change material also stores and releases sensible heat.

Various food warming devices containing phase change materials have been proposed. However, most of these devices are designed so that the phase change material is charged by heating the device in a convection oven. When heated in this manner, a lengthy period of time is required to charge the phase change material. Further, once these devices have been heated, they continue to lose heat as the phase change material discharges its stored heat energy.

Accordingly, a need remains for a heating device that is portable and that heats the food contained therein and maintains the predetermined heated temperature until the food is consumed and a user selectively turns the heating device off.

BRIEF SUMMARY OF THE INVENTION

In view of the foregoing background, it is therefore an object of the present invention to provide a device for keeping popcorn warm after popping. These and other objects, features, and advantages of the invention are provided by a device including a bag member having a centrally disposed longitudinal axis and top and bottom portions. Such a bag member is preferably formed from flexible and washable material wherein the top portion has an aperture for receiving and storing popcorn within the bag member.

The device further includes a receptacle having a closed bottom portion and an open top portion removably connectable therewith and extending substantially vertically therefrom. The bottom portion is preferably formed from non-corrosive material and includes a plurality of locking members oppositely disposed about a perimeter thereof. The top portion includes inner and outer layers preferably formed from flexible and woven fabric and a heat-retaining layer, wherein the inner and outer layers are spaced apart for defining a gap therebetween and for housing the heat-retaining layer therein.

The top portion further has a drawstring disposed about a perimeter thereof for allowing a user to selectively adapt the top portion about the bag member and for assisting to maintain thermal contact with the bag member. The receptacle preferably has a height less than a height of the bag member so that a user can readily access popcorn stored within the bag member during operating conditions.

The device further includes a mechanism for electrically heating the receptacle and the bag member wherein heat energy is transferred throughout an interior volume of the bag member for maintaining popcorn at a predetermined temperature. The heating mechanism includes a base member having substantially planar top and bottom surfaces. Such a base member includes at least one electrical conductor for receiving a plurality of conducting posts integral with the top portion of the bag member and extending vertically downwards therefrom.

The base member further includes a first switch for toggling at least one electrical conductor between on and off positions and a first light emitting diode electrically coupled to the switch. Such a diode is illuminable when the switch is toggled to an on position. The base member further includes a re-chargeable battery pack and a plurality of outlets electrically coupled thereto. One of the plurality of outlets electrically couples the re-chargeable battery pack to a power source and another of the plurality of outlets electrically couples at least one electrical conductor to a power source.

The base member further includes a second light emitting diode electrically coupled to the re-chargeable battery pack. The second diode is illuminable when the re-chargeable battery pack is electrically coupled to a power source. A second switch on the base member controls the temperature of at least one electrical conductor. Such a switch is selectively adjustable between a plurality of predetermined temperature positions for adjusting the heat energy dissipated through the bag member volume.

The heating mechanism further includes a plurality of fastening members removably engageable with the plurality of lock members for securing the base member to the bottom portion of the receptacle. A plurality of heating elements are electrically coupled to the plurality of conducting posts and spaced within the gap. A plug is also provided for electrically coupling the base member to a power source. In a preferred embodiment, the plug is electrically coupled to an AC/DC outlet. In an alternate embodiment, the plug may be electrically coupled to a vehicle 12-volt receptacle.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
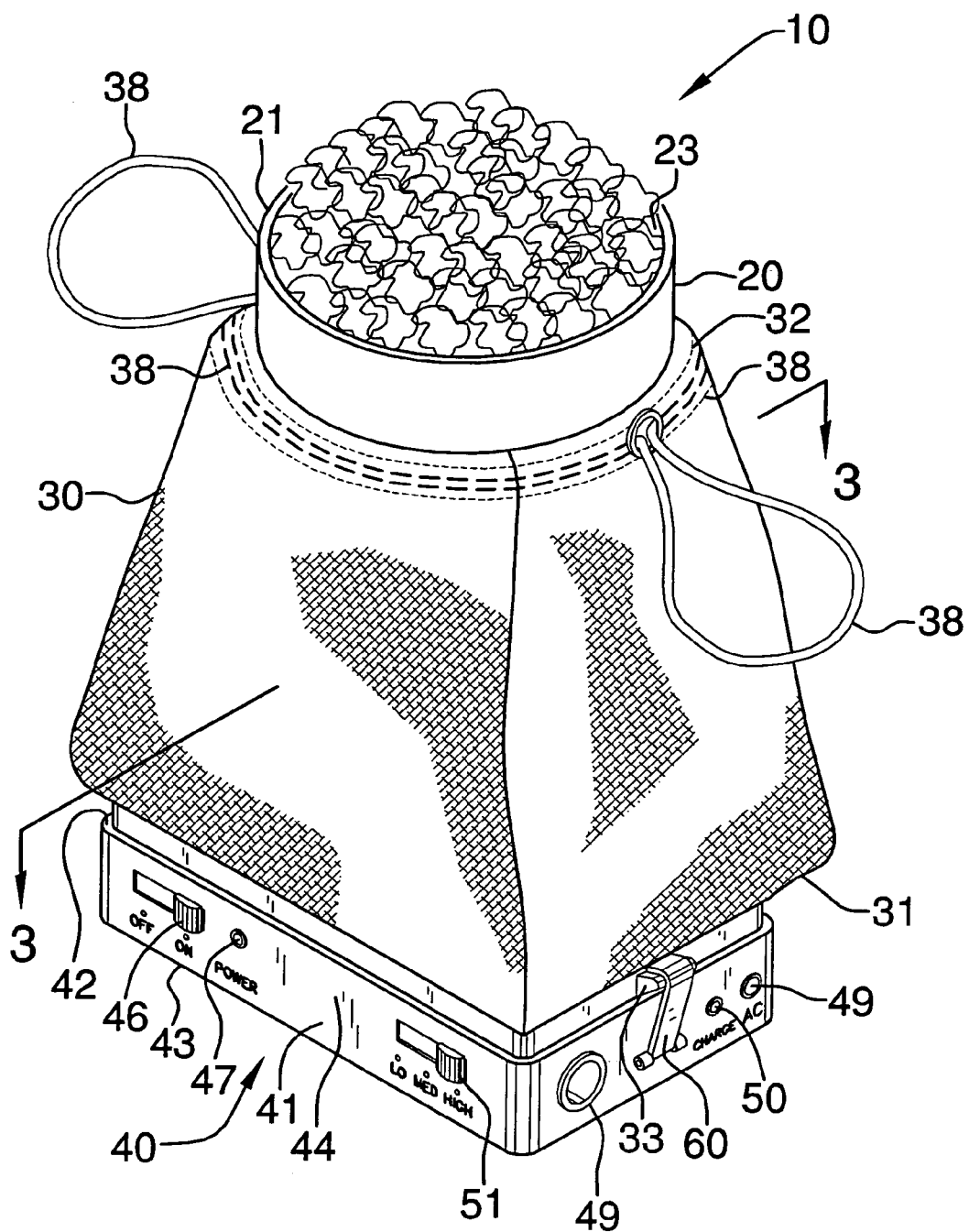
FIG. 1 is a perspective view showing a popcorn heating device, in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art. Like numbers refer to like elements throughout the figures and prime and double prime numbers refer to alternate embodiments of such elements.

The device of this invention is referred to generally in FIGS. 1–5 by the reference numeral 10 and is intended to provide a popcorn heating device. It should be understood that the device 10 may be used to heat many different types of foodstuff and should not be limited to heating only popcorn.

Figure 2:
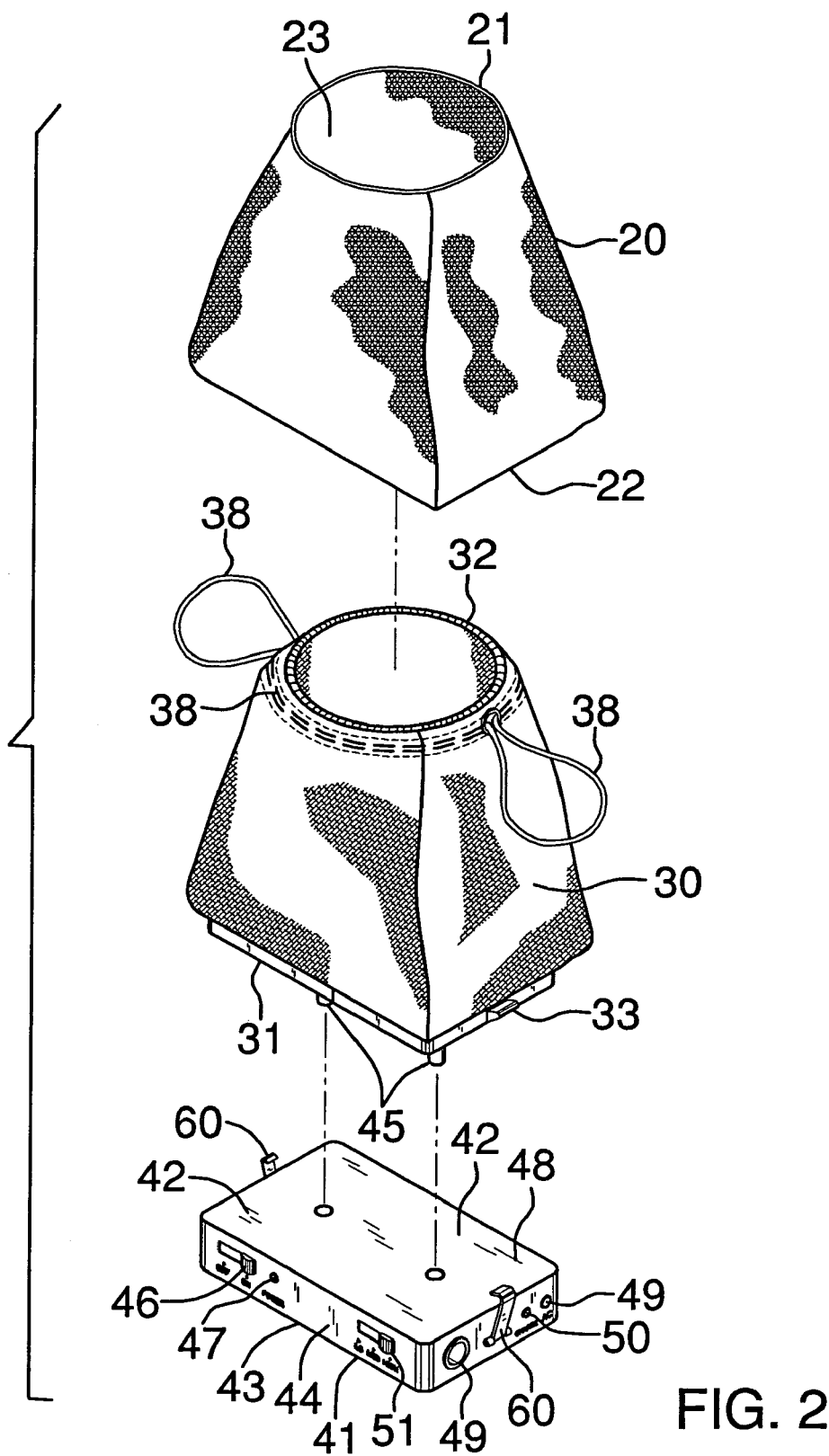
FIG. 2 is an exploded perspective view of the device shown in FIG. 1.

Initially referring to FIGS. 1 and 2, the device 10 includes a bag member 20 having a centrally disposed longitudinal axis (not shown) and top 21 and bottom 22 portions. The bag member 20 is formed from flexible and washable material so that it can be kept clean and the inevitable butter stains can be readily removed. The top portion 21 has an aperture 23 formed therein for receiving and storing popcorn within the bag member 20 so that a user can easily access the popcorn.

The device 10 further includes a receptacle 30 having a closed bottom portion 31 and an open top portion 32 removably connectable therewith and extending substantially vertically therefrom. The bottom portion 31 is formed from non-corrosive material and includes a plurality of locking members 33 oppositely disposed about a perimeter thereof. The top portion 32 includes inner 34 and outer layers 35 formed from flexible and woven fabric and a heat-retaining layer 36 wherein the inner 34 and outer 35 layers are spaced apart for defining a gap 37 therebetween and for housing the heat-retaining layer 36 therein.

The top portion 32 further has a drawstring 38 disposed about a perimeter of the top portion 32 for allowing a user to selectively adapt the top portion 31 about the bag member 20 and for assisting to maintain thermal contact with the bag member 20. This ensures that any popcorn in the bag member 20 stays warm and fresh. The receptacle 30 has a height less than a height of the bag member 20 so that a user can readily access popcorn stored within the bag member 20 during operating conditions.

The device 10 further includes a mechanism 40 for electrically heating the receptacle 30 and the bag member 20 wherein heat energy is transferred throughout an interior volume of the bag member 20 for maintaining popcorn at a predetermined temperature. The heating mechanism 40 includes a base member 41 having substantially planar top 42 and bottom 43 surfaces. The base member 41 includes at least one electrical conductor 44 for receiving a plurality of conducting posts 45 integral with the top portion 31 of the bag member 20 and extending vertically downwards therefrom.

The base member 41 further includes a first switch 46 for toggling at least one electrical conductor 44 between on and off positions and a first light emitting diode 47 electrically coupled to the switch 46 and being illuminable when the switch 46 is toggled to an on position. The base member 41 further includes a re-chargeable battery pack 48 and a plurality of outlets 49 electrically coupled thereto. One of the plurality of outlets 49 electrically couples the re-chargeable battery pack 48 to a power source and another of the plurality of outlets 49 electrically couples at least one electrical conductor 44 to a power source. The rechargeable battery pack 48 enables a user to enjoy hot, buttery popcorn at a location where a power source is not available, such as a movie theater.

The base member 41 further includes a second light emitting diode 50 electrically coupled to the re-chargeable battery pack 48. The second diode 50 is illuminated when a low charge condition exits and is illuminable when the re-chargeable battery pack 48 is electrically coupled to a power source. Such a diode 50 shuts off when pack 48 becomes fully charged.

The base member 41 further includes a second switch 51 for controlling the temperature of at least one electrical conductor 44. The second switch 51 s selectively adjustable between a plurality of predetermined temperature positions so that a user can serve the popcorn at varying temperatures according to individual preferences.

Figure 3:
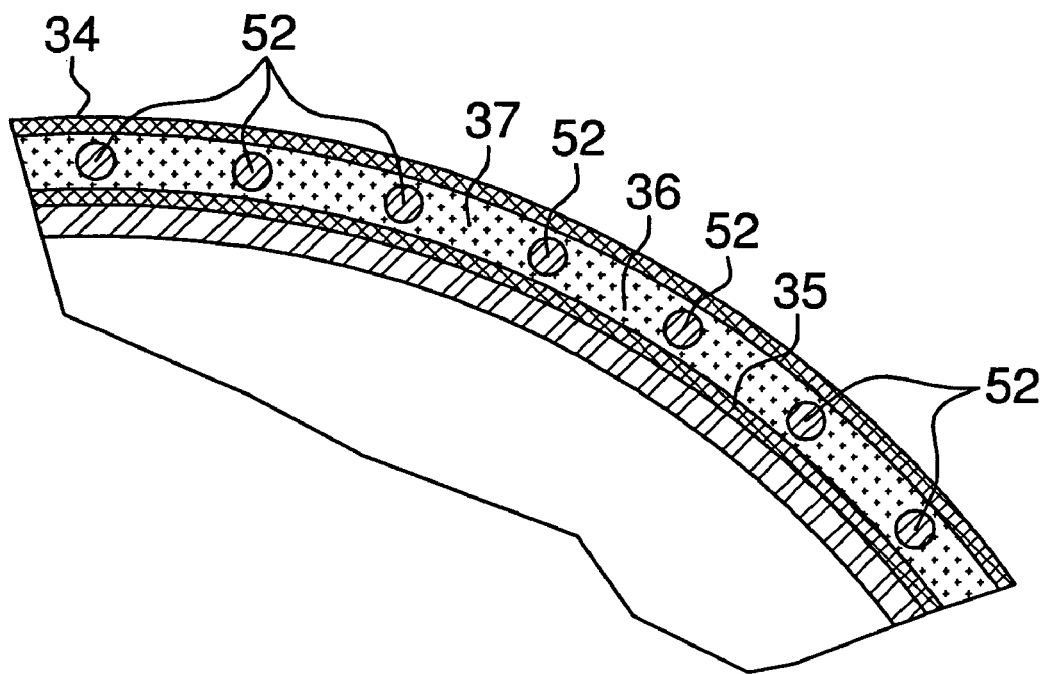
FIG. 3 is an enlarged cross-sectional view showing the plurality of heating elements spaced within the gap of the receptacle, taken along line 3—3.
Figure 4:
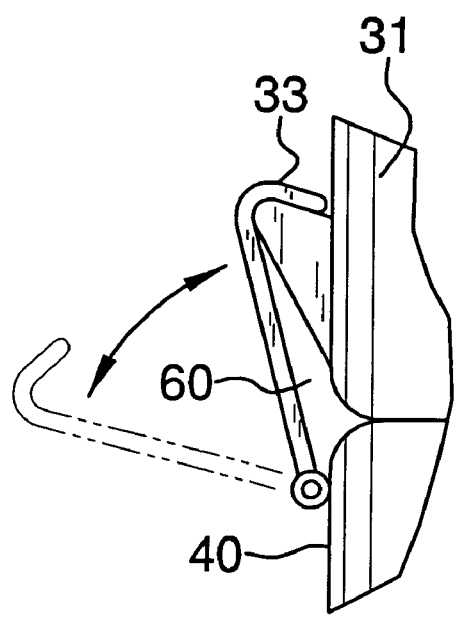
FIG. 4 is an enlarged side elevational view of a fastening member engaging a locking member.

The heating mechanism 40 further includes a plurality of fastening members 60 removably engageable with the plurality of lock members 33 for securing the base member 41 to the bottom portion 31 of the receptacle 30, as shown in FIG. 4. The heating mechanism 40 further includes a plurality of heating elements 52 electrically coupled to the plurality of conducting posts 45 and spaced within the gap 37, as shown in FIG. 3, and a plug 53 for electrically coupling the base member 41 to a power source. The plurality of heating elements 52 keep the bag member 20 and the contents thereof warm so that a user can enjoy hot popcorn long after it has been popped.

Figure 5:
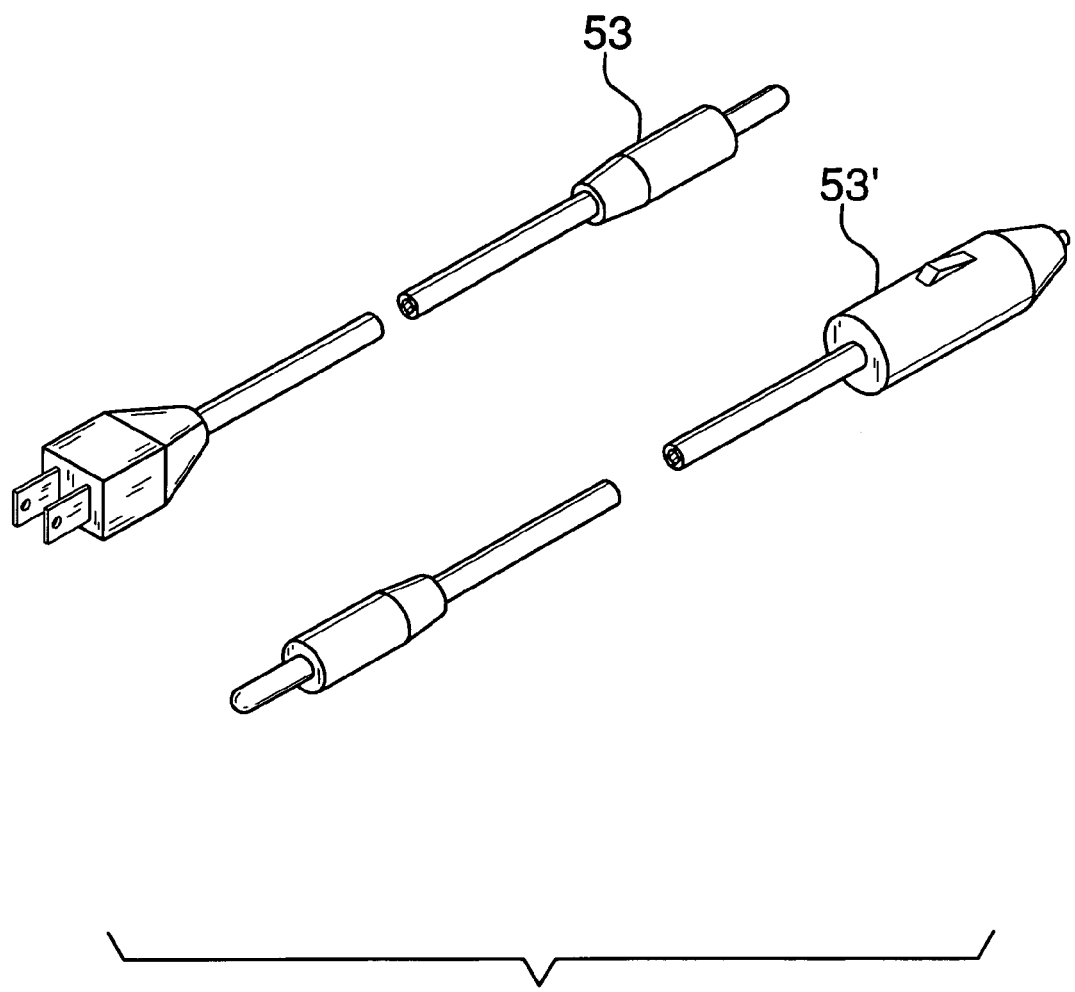
FIG. 5 is a perspective view showing an AC/DC plug and a vehicle 12-volt plug respectively.

Now referring to FIG. 5, in a preferred embodiment, the plug 53 is electrically coupled to an AC/DC outlet. In an alternate embodiment, the plug 53' is electrically coupled to a vehicle 12-volt receptacle. This enables a user to enjoy hot popcorn while in a vehicle at a drive-in movie or other location such as a sporting event tailgate party.

The device 10 provides moviegoers and others with a quick and simple way to keep popcorn warm and appealing for a longer time period. It could be used while sitting in a movie theater, a drive-in, or at home and would ensure a user that his/her popcorn is warm, buttery, and appetizing. The device 10 is compact, lightweight and portable so that a user can readily transport it to a desired location.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A popcorn heating device for keeping popcorn warm after popping, said device comprising:
   a bag member having a centrally disposed longitudinal axis and top and bottom portions, said top portion having an aperture formed therein for receiving and storing popcorn within said bag member;
   a receptacle having a closed bottom portion and an open top portion removably connectable therewith and extending substantially vertically therefrom, said bottom portion including a plurality of locking members oppositely disposed about a perimeter thereof, said top portion comprising inner and outer layers and a heat-retaining layer wherein said inner and outer layers are spaced apart for defining a gap therebetween and for housing said heat-retaining layer therein, said top portion further having a drawstring disposed about a perimeter of said top portion for allowing a user to selectively adapt the top portion about said bag member and for assisting to maintain thermal contact with said bag member; and
   means for electrically heating said receptacle and said bag member wherein heat energy is transferred throughout an interior volume of said bag member for maintaining popcorn at a predetermined temperature.

2. The device of claim 1, wherein said bag member is formed from flexible and washable material.

3. The device of claim 1, wherein said bottom portion of said receptacle is formed from non-corrosive material and said top portion of said receptacle is formed from flexible and woven fabric.

4. The device of claim 1, wherein said heating means comprises:
   a base member having substantially planar top and bottom surfaces, said base member comprising at least one electrical conductor for receiving a plurality of conducting posts integral with said bottom portion of said receptacle and extending vertically downwards therefrom;
   a plurality of fastening members removably engageable with said plurality of lock members for securing said base member to said bottom portion of said receptacle;
   a plurality of heating elements electrically coupled to said plurality of conducting posts and spaced within the gap; and
   a plug for electrically coupling said base member to a power source.

5. The device of claim 4, wherein said base member further comprises:
   a first switch for toggling said at least one electrical conductor between on and off positions;
   a first light emitting diode electrically coupled to said switch and being illuminable when said switch is toggled to an on position;
   a re-chargeable battery pack;
   a plurality of outlets electrically coupled thereto, one said plurality of outlets for electrically coupling said re-chargeable battery pack to a power source, another said plurality of outlets for electrically coupling said at least one electrical conductor to a power source;
   a second light emitting diode electrically coupled to said re-chargeable battery pack, said second diode being illuminable when said rechargeable battery pack is electrically coupled to a power source; and
   a second switch for controlling the temperature of said at least one electrical conductor, said switch being selectively adjustable between a plurality of predetermined temperature positions.

6. The device of claim 4, wherein said plug is electrically coupled to a vehicle 12-volt receptacle.

7. The device of claim 4, wherein said plug is electrically coupled to an AC/DC outlet.

8. The device of claim 1, wherein said receptacle has a height less than a height of said bag member so that a user can readily access popcorn stored within said bag member during operating conditions.

9. A popcorn heating device for keeping popcorn warm after popping, said device comprising:
   a bag member having a centrally disposed longitudinal axis and top and bottom portions, said top portion having an aperture formed therein for receiving and storing popcorn within said bag member, said bag member being formed from flexible and washable material;
   a receptacle having a closed bottom portion and an open top portion removably connectable therewith and extending substantially vertically therefrom, said bottom portion including a plurality of locking members oppositely disposed about a perimeter thereof, said top portion comprising inner and outer layers and a heat-retaining layer wherein said inner and outer layers are spaced apart for defining a gap therebetween and for housing said heat-retaining layer therein, said top portion further including a drawstring disposed about a perimeter of said top portion for allowing a user to selectively adapt the top portion about said bag member and for assisting to maintain thermal contact with said bag member; and
   means for electrically heating said receptacle and said bag member wherein heat energy is transferred throughout an interior volume of said bag member for maintaining popcorn at a predetermined temperature.

10. The device of claim 9, wherein said bottom portion of said receptacle is formed from non-corrosive material and said top portion of said receptacle is formed from flexible and woven fabric.

11. The device of claim 9, wherein said heating means comprises:
   a base member having substantially planar top and bottom surfaces, said base member comprising at least one electrical conductor for receiving a plurality of conducting posts integral with said bottom portion of said receptacle and extending vertically downwards therefrom;

a plurality of fastening members removably engageable with said plurality of lock members for securing said base member to said bottom portion of said receptacle;

a plurality of heating elements electrically coupled to said plurality of conducting posts and spaced within the gap; and a plug for electrically coupling said base member to a power source.

12. The device of claim 11, wherein said base member further comprises:

a first switch for toggling said at least one electrical conductor between on and off positions;

a first light emitting diode electrically coupled to said switch and being illuminable when said switch is toggled to an on position;

a re-chargeable battery pack;

a plurality of outlets electrically coupled thereto, one said plurality of outlets for electrically coupling said re-chargeable battery pack to a power source, another said plurality of outlets for electrically coupling said at least one electrical conductor to a power source;

a second light emitting diode electrically coupled to said re-chargeable battery pack, said second diode being illuminable when said re-chargeable battery pack is electrically coupled to a power source; and a second switch for controlling the temperature of said at least one electrical conductor, said switch being selectively adjustable between a plurality of predetermined temperature positions.

13. The device of claim 11, wherein said plug is electrically coupled to a vehicle 12-volt receptacle.

14. The device of claim 11, wherein said plug is electrically coupled to an AC/DC outlet.

15. The device of claim 9, wherein said receptacle has a height less than a height of said bag member so that a user can readily access popcorn stored within said bag member during operating conditions.

16. A popcorn heating device for keeping popcorn warm after popping, said device comprising:

a bag member having a centrally disposed longitudinal axis and top and bottom portions, said top portion having an aperture formed therein for receiving and storing popcorn within said bag member, said bag member being formed from flexible and washable material;

a receptacle having a closed bottom portion and an open top portion removably connectable therewith and extending substantially vertically therefrom, said bottom portion including a plurality of locking members oppositely disposed about a perimeter thereof, said top portion comprising inner and outer layers and a heat-retaining layer wherein said inner and outer layers are spaced apart for defining a gap therebetween and for housing said heat-retaining layer therein, said top portion further having a drawstring disposed about a perimeter of said top portion for allowing a user to selectively adapt the top portion about said bag member and for assisting to maintain thermal contact with said bag member, said receptacle further having a height less than a height of said bag member so that a user can readily access popcorn stored within said bag member during operating conditions; and means for electrically heating said receptacle and said bag member wherein heat energy is transferred throughout an interior volume of said bag member for maintaining popcorn at a predetermined temperature.

17. The device of claim 16, wherein said bottom portion of said receptacle is formed from non-corrosive material and said top portion of said receptacle is formed from flexible and woven fabric.

18. The device of claim 16, wherein said heating means comprises:

a base member having substantially planar top and bottom surfaces, said base member comprising at least one electrical conductor for receiving a plurality of conducting posts integral with said bottom portion of said receptacle and extending vertically downwards therefrom;

a plurality of fastening members removably engageable with said plurality of lock members for securing said base member to said bottom portion of said receptacle;

a plurality of heating elements electrically coupled to said plurality of conducting posts and spaced within the gap; and a plug for electrically coupling said base member to a power source.

19. The device of claim 18, wherein said base member further comprises:

a first switch for toggling said at least one electrical conductor between on and off positions;

a first light emitting diode electrically coupled to said switch and being illuminable when said switch is toggled to an on position;

a re-chargeable battery pack;

a plurality of outlets electrically coupled thereto, one said plurality of outlets for electrically coupling said re-chargeable battery pack to a power source, another said plurality of outlets for electrically coupling said at least one electrical conductor to a power source;

a second light emitting diode electrically coupled to said rechargeable battery pack, said second diode being illuminable when said re-chargeable battery pack is electrically coupled to a power source; and a second switch for controlling the temperature of said at least one electrical conductor, said switch being selectively adjustable between a plurality of predetermined temperature positions.

20. The device of claim 18, wherein said plug is electrically coupled to a vehicle 12-volt receptacle.

* * * * *